D. S. CANTINE.
ATTACHMENT FOR HARVESTERS.
APPLICATION FILED AUG. 15, 1910.

1,021,755.

Patented Mar. 26, 1912.

WITNESSES

INVENTOR

UNITED STATES PATENT OFFICE.

DELANCY S. CANTINE, OF WALNUT GROVE, MINNESOTA.

ATTACHMENT FOR HARVESTERS.

1,021,755.   Specification of Letters Patent.   Patented Mar. 26, 1912.

Application filed August 15, 1910. Serial No. 577,366.

*To all whom it may concern:*

Be it known that I, DELANCY S. CANTINE, of Walnut Grove, Redwood county, Minnesota, have invented a new and useful Attachment for Harvesters, of which the following is a full, clear, and exact description, reference being had to the accompanying drawings, forming part of this specification, in which—

Figure 1:
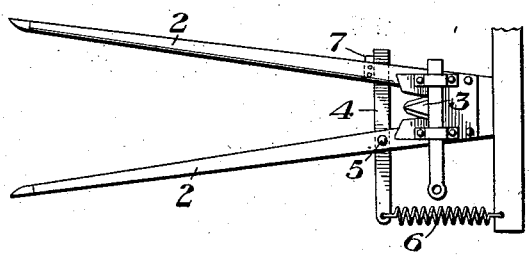
Figure 2:
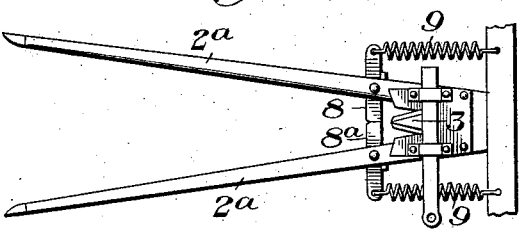

Figures 1 and 2 are plan views showing a portion of a corn harvester having my invention applied thereto; the two figures showing different forms of the invention.

Considerable difficulty is experienced in the operation of corn harvesters, corn cutters, huskers, and cane cutters, harvesters, and the like, by reason of grass, weeds, and other foreign matter, which is cut or pulled with the corn and is elevated and carried into the machine with the corn. This grass and other foreign matter winds into the machinery, clogs the elevator, and the knives, or stops machinery entirely.

The object of my invention is to provide a simple device which can be readily attached to various kinds of these machines, either new or old, and which will entirely overcome this difficulty. This object is accomplished by the provision of a bar or lever placed in the throat of the machine in advance of the knives, and which acts to bend over weeds, grass, etc., and keep such weeds and grass from passing into the knives, while permitting the corn stalks to pass readily to the knives.

Referring first to the form of my invention shown in Fig. 1, the numerals 2—2 designate the throat-forming bars or guides of a corn cutter or harvester, these bars or guides forming the passage through which the stalks are guided to the usual reciprocating knife or cutter 3. Placed transversely across this throat, preferably at the under side thereof, is a bar or lever 4, pivoted at 5, and having a spring 6 attached to one arm thereof. The opposite bar is provided with a suitable stop 7 for limiting the forward movement of the free arm of the lever.

The operation is as follows:—The resistance of the spring 6 is made sufficiently great so that all weeds, grass, and the like which contact with the bar or lever will be bent downwardly and prevented from passing farther into the throat to the knives. When, however, a corn stalk strikes the bar 4, the resistance of the spring is overcome and the free arm of the bar moves backwardly and permits the stalk to pass to the knives.

In the form of my invention shown in Fig. 2, instead of a single bar or lever of the character described, I provide two of these bars or levers 8 and 8ª pivoted to the throat or guide bars 2ª and each having a spring 9. The operation of this form of the invention is substantially the same as that of the form first described, but has the advantage that where corn comes in on one side of the knife it will keep grass and weeds out of the other side, and will thus be more effective than the single bar or lever. As soon as the corn stalk has passed the bar or lever, or the two bars or levers, the spring or springs will pull the latter back to place. The knife, therefore, will only cut such grass or weeds as are close to the hill, and these going inward with the corn stalks do not cause any difficulty, as the stalks are stiff and carry the weeds back with them. The lever being attached to the under side of the frame strikes the corn stalks so low down and near the ground that it does not bend the corn down, but will bend down all ordinary weeds, grass, and grain, so that the knife passes over them without cutting. My invention also obviates the trouble which has heretofore been experienced in making turns at the end of corn fields where there is apt to be more or less weeds, grass, etc., and also in driving to and from the field. Heretofore, the machines would clog up with grass and weeds and have to be stopped and cleaned before starting to cut.

By the use of a device of this character on a cane harvester, the major portion of the grass and weeds will be eliminated from the harvested cane which will greatly enhance its value, as the juice from the cane after the cane has been passed through the crusher will be free from the juice of grass and weeds.

The device can be readily attached to various makes and kinds of machines at relatively small cost; and if any particular piece of corn is so clean as to make the use of the device unnecessary, it can be quickly and readily detached and removed.

I do not desire to limit myself to the exact forms of my invention which I have herein shown and described, as it will be obvious that the form and arrangement of the bars or levers and their exact mode of attachment to the frame of the machine may be considerably varied without departing from the spirit and scope of my invention as defined in the appended claim.

What I claim is:—

A harvester having cutters, a stalk guiding throat, a pivoted bar extending in a horizontal plane transversely of the throat directly in front of the cutters and in substantially the same horizontal plane with the cutters and having its front face at substantially right angles to the longitudinal center line of the throat, a spring connected to said bar, said spring having a resistance sufficient to cause the bar to bend over weeds and the like when said bar is pressed against them, but yielding to permit movement of said bar when it is pressed against the stalks to be harvested, together with stop means carried by the members of the guiding throat for limiting the forward movement of the bar; substantially as described.

In testimony whereof, I have hereunto set my hand.

DELANCY S. CANTINE.

Witnesses:
C. E. REMINGTON,
H. O. GARLOCK.